(12) United States Patent
Adams et al.

(10) Patent No.: US 7,539,730 B2
(45) Date of Patent: May 26, 2009

(54) SYSTEM AND METHOD FOR SELECTING MESSAGING SETTINGS ON A MESSAGING CLIENT

(75) Inventors: Neil P. Adams, Waterloo (CA); Michael S. Brown, Waterloo (CA); Herbert A. Little, Waterloo (CA); Anthony F. Scian, Waterloo (CA); Michael K. Brown, Peterborough (CA)

(73) Assignee: Research In Motion Limited, Waterloo (CA)

( * ) Notice: Subject to any disclaimer, the term of this patent is extended or adjusted under 35 U.S.C. 154(b) by 880 days.

(21) Appl. No.: 10/688,543

(22) Filed: Oct. 17, 2003

(65) Prior Publication Data

US 2004/0139162 A1 Jul. 15, 2004

Related U.S. Application Data

(60) Provisional application No. 60/494,625, filed on Aug. 12, 2003, provisional application No. 60/419,103, filed on Oct. 18, 2002.

(51) Int. Cl.
*G06F 13/00* (2006.01)

(52) U.S. Cl. .................. 709/206; 709/219; 709/228; 719/328

(58) Field of Classification Search .................. 709/206, 709/219, 223, 217, 227, 228, 204; 719/328, 719/329
See application file for complete search history.

(56) References Cited

U.S. PATENT DOCUMENTS

| | | | |
|---|---|---|---|
| 5,544,316 A | 8/1996 | Carpenter | |
| 5,809,232 A | 9/1998 | Johnson | |
| 5,958,005 A | 9/1999 | Thorne | |
| 6,081,899 A * | 6/2000 | Byrd | 726/2 |
| 6,356,937 B1 * | 3/2002 | Montville et al. | 709/206 |
| 6,411,685 B1 * | 6/2002 | O'Neal | 379/88.14 |
| 6,434,222 B1 * | 8/2002 | Shaffer et al. | 379/88.13 |
| 6,442,600 B1 | 8/2002 | Anderson | |
| 6,496,853 B1 | 12/2002 | Klein | |
| 6,609,196 B1 | 8/2003 | Dickinson | |
| 6,732,101 B1 | 5/2004 | Cook | |
| 6,832,314 B1 * | 12/2004 | Irvin | 713/162 |
| 7,093,129 B1 * | 8/2006 | Gavagni et al. | 713/175 |
| 7,127,606 B2 * | 10/2006 | Wheeler et al. | 713/156 |

(Continued)

FOREIGN PATENT DOCUMENTS

WO WO 02/35869 A1 5/2002

OTHER PUBLICATIONS

International Search Report of Application No. PCT/CA03/01584, date of mailing Jun. 18, 2004—7pgs.

(Continued)

*Primary Examiner*—Viet Vu
(74) *Attorney, Agent, or Firm*—Jones Day; Krishna K. Pathiyal; Robert C. Liang

(57) ABSTRACT

A system and method of selecting messaging settings on a messaging client are provided. A display configured to operate in conjunction with the messaging client displays a compose screen that includes a message portion and a messaging settings portion when an outgoing message is to be composed on the messaging client. Messaging settings selected to control message characteristics of the outgoing message are displayed in the messaging settings portion of the compose screen.

22 Claims, 7 Drawing Sheets

U.S. PATENT DOCUMENTS

| | | | |
|---|---|---|---|
| 7,209,951 B2 | 4/2007 | Goldberg | |
| 2001/0037315 A1* | 11/2001 | Saliba et al. | 705/70 |
| 2002/0112015 A1* | 8/2002 | Haynes | 709/206 |
| 2002/0121394 A1 | 9/2002 | Kamen | |
| 2002/0129275 A1 | 9/2002 | Decuir | |
| 2002/0147778 A1 | 10/2002 | Dutta | |
| 2003/0070077 A1* | 4/2003 | Redlich et al. | 713/182 |
| 2003/0115448 A1 | 6/2003 | Bouchard | |
| 2003/0225837 A1* | 12/2003 | Delia et al. | 709/206 |
| 2004/0139163 A1 | 7/2004 | Adams et al. | |
| 2005/0039028 A1* | 2/2005 | Eason | 713/187 |
| 2006/0031299 A1 | 2/2006 | Robertson | |

OTHER PUBLICATIONS

International Search Report of Application No. PCT/CA03/01583, date of mailing Jun. 18, 2004—7pgs.

Globalsign: "Netscapetut" Globalsign Support—Personal Certificates and Netscape Communicator, 'Oneline!, Aug. 19, 2000, XP-002283474, 6pgs.

Ramsdell B: "RFC 2633: S/MIME Version 3 Message Specification" Network Working Group-Request for Comments, Jun. 1999, XP-002262227, pp. 1-32.

Anonymous: "The Windows Interface Guidelines for Software Design," 1995, Microsoft Press, Redmond Washington 98052-6399, USA.

Responsive Amendment dated Jul. 28, 2008 for U.S. Appl. No. 10/688,544 entitled "Message Settings Selection".

USPTO: Office Action dated Apr. 28, 2008 for U.S. Appl. No. 10/688,544 entitled "Message Settings Selection".

Responsive Amendment dated Jan. 7, 2008 for U.S. Appl. No. 10/688,544 entitled "Message Settings Selection".

USPTO: Final Office Action dated Nov. 5, 2007 for U.S. Appl. No. 10/688,544 entitled "Message Settings Selection".

Responsive Amendment dated Sep. 21, 2007 for U.S. Appl. No. 10/688,544 entitled "Message Settings Selection".

Ramsdell, B.: "RFC 2633: S/MIME Version 3 Message Specification," IETF Network Working Group, Jun. 1999, XP002262227, http://www.ietf.org/rfc/rfc2633.txt, 32 pgs.

De Moura, et al.: "SMMM - A Secure Multimedia Mail System," Multimedia and Expo, 2000, ICME 2000, 2000 IEEE International Conference in New York, NY, USA, Jul. 30-Aug. 2, 2000, Piscataway, NJ, USA, IEEE, US, Jul. 30, 2000, pp. 1501-1504, XP010512790.

Atkins, et al.; Network Working Group, Request for Comments 1991, PGP Message Exchange Formats; Aug. 1996.

USPTO: Office Action dated Nov. 21, 2007 for U.S. Appl. No. 10/522,353 entitled "System and Method of Mimetic Message Settings Selection".

USPTO: Final Office Action dated Apr. 10, 2008 for U.S. Appl. No. 10/522,353 entitled "System and Method of Mimetic Message Settings Selection".

USPTO: Advisory Action dated Jul. 22, 2008 for U.S. Appl. No. 10/522,353 entitled "System and Method of Mimetic Message Settings Selection".

Response filed Aug. 8, 2008 for U.S. Appl. No. 10/522,353 entitled "System and Method of Mimetic Message Settings Selection".

Responsive Amendment dated Feb. 15, 2008 for U.S. Appl. No. 10/522,353 entitled "System and Method of Mimetic Message Settings Selection".

Responsive Amendment dated Jul. 9, 2008 for U.S. Appl. No. 10/522,353 entitled "System And Method of Mimetic Message Settings Selection".

USPTO: Office Action dated Jun. 22, 2007 for U.S. Appl. No. 10/688,544 entitled "Message Settings Selection".

* cited by examiner

SYSTEM AND METHOD FOR SELECTING MESSAGING SETTINGS ON A MESSAGING CLIENT

CROSS-REFERENCE TO RELATED APPLICATIONS

This application claims the benefit, pursuant to 35 U.S.C. §119(e), of provisional U.S. patent applications No. 60/419,103, filed Oct. 18, 2002, entitled "MESSAGE SETTINGS SELECTION AND DISPLAY", and No. 60/494,625, filed Aug. 12, 2003, entitled "MESSAGE SETTINGS SELECTION", which applications are, by this reference, hereby incorporated herein for all purposes.

BACKGROUND

This application relates generally to the field of secure electronic messaging, and in particular to selecting messaging configuration settings on a messaging client.

Known secure messaging software clients, such as e-mail software applications operating on desktop computer systems, use only one set of messaging settings at a time. Messaging settings may be established using a mouse, a keyboard or another input device, for example, to configure such message characteristics as formats, fonts, and common text that should appear in all outgoing messages, as well as secure messaging characteristics such as message signing and encryption. Although a user may establish more than one group of settings, only one group, previously selected as current or default settings, controls messaging operations on a messaging client at any time. In order to configure different message characteristics than those established in the current settings for an outgoing message, the current settings must be over-ridden or another group of settings must be selected. These operations may be cumbersome, particularly when message characteristics must be changed frequently, such as when the addressees of outgoing messages have different messaging capabilities.

SUMMARY

A method of selecting messaging settings for an outgoing message on a messaging client is provided. The method includes the steps of providing an interface for composing an outgoing message that includes a message portion and a messaging settings portion and receiving one or more messaging settings for controlling one or more message characteristics of the outgoing message. In some instances, the method may further include the step of displaying the received messaging settings in the messaging settings portion of the compose screen. The method may also include the steps of determining whether a record for an addressed recipient of the outgoing message exists in a data store and selecting messaging settings to control message characteristics of the outgoing message based on the record where a record exists; these steps may be performed instead of, or in addition to, the step of receiving one or more messaging settings. The method may also include transmission of the outgoing message based at least in part upon the received messaging settings.

A system of selecting and displaying messaging settings is also provided. The system includes a messaging client configured to send outgoing messages, each of the messages having message characteristics, and a display configured to operate in conjunction with the messaging client. The messaging client is further configured to display a compose screen comprising a message portion and a messaging settings portion on the display when an outgoing message is to be composed on the messaging client and to receive messaging settings to control the message characteristics of the outgoing message. Some such systems may further include a data store for storing records comprising one or more messaging settings.

DETAILED DESCRIPTION

Figure 1:
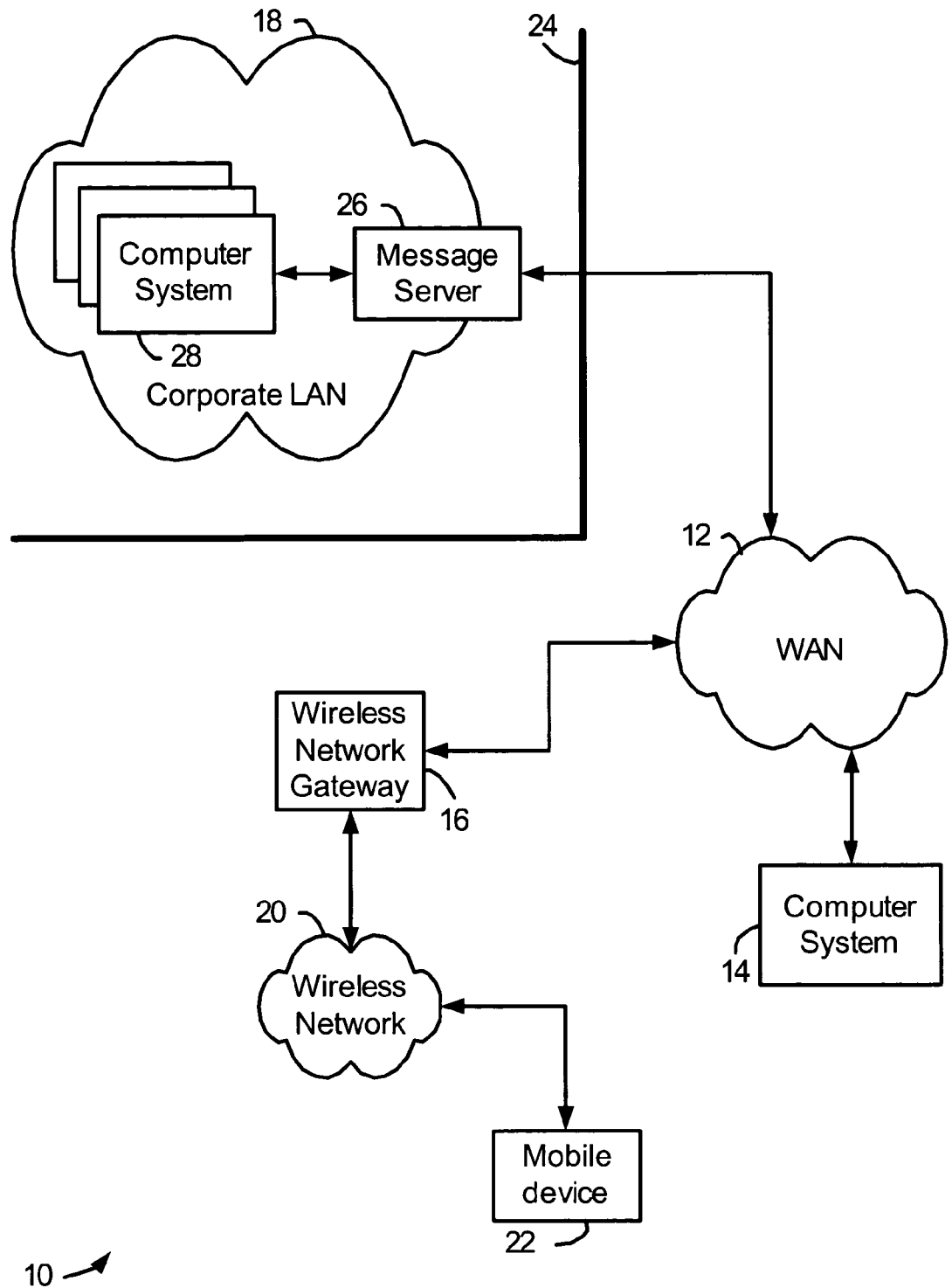
FIG. 1 is a block diagram of a messaging system.

Examples are now described in detail. Referring to the drawings, like numbers indicate like parts throughout the views. As used in the herein, the meaning of "a," "an," and "the" includes plural reference unless the context clearly dictates otherwise. Also, as used in the description herein, the meaning of "in" includes "in" and "on" unless the context clearly dictates otherwise. Finally, as used in the herein, the meanings of "and" and "or" include both the conjunctive and disjunctive and may be used interchangeably unless the context clearly dictates otherwise; the phrase "exclusive or" may be used to indicate situation where only the disjunctive meaning may apply.

Messaging settings control general message characteristics such as message format and fonts for both insecure messages and secure messages. Insecure messages include, for example, e-mail messages that are exchanged between messaging clients through the Internet. Secure message characteristics such as message signing and encryption are also controlled by establishing message settings. Secure messages may be signed with a digital signature, encrypted, or both signed and encrypted, and may also be processed in other ways by a message sender or intermediate system between a message sender and a messaging client which receives the secure message. For example, secure messages include messages that have been signed, encrypted and then signed, or signed and then encrypted, by a message sender according to variants of Secure Multipurpose Internet Mail Extensions (S/MIME). A secure message could similarly be encoded, compressed or otherwise processed either before or after being signed and/or encrypted. Thus, a group of message settings may include general message settings, secure message settings or both.

A messaging client allows a system on which it operates to receive and possibly also send messages. Messaging clients operate on a computer system, a handheld device, or any other system or device with communications capabilities. Many messaging clients also have additional non-messaging functions.

FIG. 1 is a block diagram of a messaging system. The system 10 includes a Wide Area Network (WAN) 12, coupled to a computer system 14, a wireless network gateway 16, and a corporate Local Area Network (LAN) 18. The wireless network gateway 16 is also coupled to a wireless communication network 20, in which a wireless mobile communication device 22 ("mobile device") is configured to operate.

The computer system 14 is a desktop or laptop personal computer (PC), which is configured to communicate to the WAN 12, which is the Internet in most implementations. PCs, such as computer system 14, normally access the Internet through an Internet Service Provider (ISP), an Application Service Provider (ASP), or the like.

The corporate LAN 18 is a network-based messaging client. It is normally located behind a security firewall 24. Within the corporate LAN 18, a message server 26, operating on a computer behind the firewall 24, serves as the primary interface for the corporation to exchange messages both within the LAN 18, and with other external messaging clients via the WAN 12. Two known message servers 26 are Microsoft™ Exchange server and Lotus Domino™ server. These servers 26 are often used in conjunction with Internet mail routers that route and deliver mail messages. A server such as the message server 26 also typically provides additional functionality, such as dynamic database storage for calendars, to do lists, task lists, e-mail, electronic documentation, etc.

The message server 26 provides messaging capabilities to the corporation's networked computer systems 28 coupled to the LAN 18. A typical LAN 18 includes multiple computer systems 28, each of which implements a messaging client, such as Microsoft Outlook™, Lotus Notes, etc. Within the LAN 18, messages are received by the message server 26, distributed to the appropriate mailboxes for user accounts addressed in the received message, and then accessed by a user through a computer system 28 operating as a messaging client.

The wireless gateway 16 provides an interface to a wireless network 20, through which messages are exchanged with a mobile device 22. Such functions as addressing of the mobile device 22, encoding or otherwise transforming messages for wireless transmission, and any other required interface functions are performed by the wireless gateway 16. Although the wireless gateway 16 operates with the single wireless network 20 in FIG. 1, wireless gateways may be configured to operate with more than one wireless network in alternative embodiments, in which case the wireless gateway may also determine a most likely network for locating a given mobile device user and may also track users as they roam between countries or networks.

Any computer system 14, 28 with access to the WAN 12 may exchange messages with a mobile device 22 through the wireless network gateway 16. Alternatively, private wireless network gateways, such as wireless Virtual Private Network (VPN) routers, could be implemented to provide a private interface to a wireless network. For example, a wireless VPN router implemented in the LAN 18 would provide a private interface from the LAN 18 to one or more mobile devices such as the mobile device 22 through the wireless network 20. Wireless VPN routers and other types of private interfaces to the mobile device 22 may effectively be extended to entities outside the LAN 18 by providing a message forwarding or redirection system that operates with the message server 26. Such a redirection system is disclosed in U.S. Pat. No. 6,219,694, which is hereby incorporated into this application by reference. In this type of redirection system, incoming messages received by the message server 26 and addressed to a user of a mobile device 22 are sent through the wireless network interface, either a wireless VPN router, wireless gateway 16 or other interface, to the wireless network 20 and to the user's mobile device 22. Another alternate interface to a user's mailbox on a message server 26 is a Wireless Application Protocol (WAP) gateway, through which a list of messages in a user's mailbox on the message server 26, and possibly each message or a portion of each message, could be sent to the mobile device 22.

Wireless networks such as the wireless network 20 normally deliver information to and from mobile devices via RF transmissions between base stations and the mobile devices. The wireless network 20 may, for example, be a data-centric wireless network, a voice-centric wireless network, or a dual-mode network that can support both voice and data communications over the same infrastructure. Known data-centric network include the Mobitex™ Radio Network ("Mobitex"), and the DataTAC™ Radio Network ("DataTAC"). Examples of known voice-centric data networks include Personal Communication Systems (PCS) networks like Global System for Mobile Communications (GSM) and Time Division Multiple Access (TDMA) systems. Dual-mode wireless networks include Code Division Multiple Access (CDMA) networks, General Packet Radio Service (GPRS) networks, and so-called third-generation (3G) networks, such as Enhanced Data rates for Global Evolution (EDGE) and Universal Mobile Telecommunications Systems (UMTS), which are currently under development.

The mobile device 22 is a data communication device, a voice communication device, or a multiple-mode device capable of voice, data and other types of communications. An exemplary mobile device 22 is described in further detail below.

Perhaps the most common type of messaging currently in use is e-mail. In a standard e-mail system, an e-mail message is sent by an e-mail sender, possibly through a message server and/or a service provider system, and is then routed through the Internet, when necessary, to one or more message receivers. E-mail messages are normally sent in the clear and typically use Simple Mail Transfer Protocol (SMTP) headers and Multi-purpose Internet Mail Extensions (MIME) body parts to define the format of the e-mail message.

In recent years, secure messaging techniques have evolved to protect both the content and integrity of messages, such as e-mail messages. S/MIME and Pretty Good Privacy™ (PGP™) are two public key secure e-mail messaging protocols that provide for both encryption, to protect data content, and signing, which protects the integrity of a message and provides for sender authentication by a message receiver. In addition to utilizing digital signatures and possibly encryption, secure messages may also or instead be encoded, compressed or otherwise processed.

Figure 2:
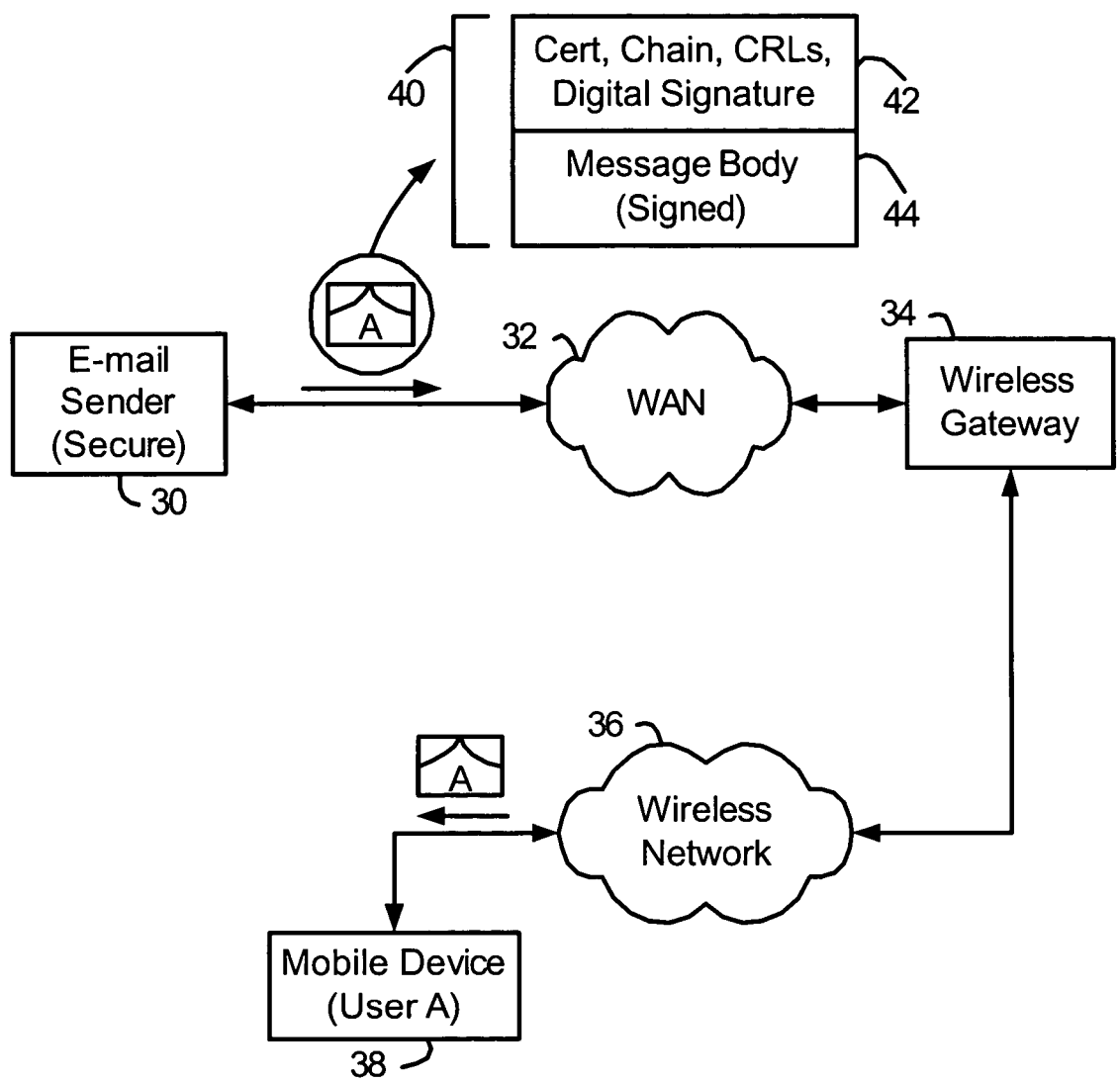
FIG. 2 is a block diagram illustrating a secure e-mail message exchange in a messaging system.

FIG. 2 is a block diagram illustrating a secure e-mail message exchange in a messaging system. The system includes an e-mail sender 30 coupled to a WAN 32, and a wireless gateway 34, which provides an interface between the WAN 32 and a wireless network 36. A mobile device 38 is adapted to operate within the wireless network 36.

The e-mail sender 30 is a PC, such as the system 14 in FIG. 1, a network-connected computer, such as computer 28 in FIG. 1, or a mobile device, on which a messaging client operates to enable e-mail messages to be composed and sent. The WAN 32, wireless gateway 34, wireless network 36 and mobile device 38 are substantially the same as similarly-labelled components in FIG. 1.

In an example digital signature scheme, a secure e-mail message sender 30 digitally signs a message by taking a digest of the message and signing the digest using the sender's private key. A digest may, for example, be generated by performing a check-sum, a Cyclic Redundancy Check (CRC), a hash, or some other non-reversible operation on the message. This digest is then digitally signed by the sender using the sender's private key. The private key is used to perform an encryption or some other transformation operation on the digest to generate a digital signature. A digital signature, including the digest and the digital signature, is then appended to the outgoing message. In addition, a digital Certificate (Cert) of the sender, which includes the sender's public key and sender identity information that is bound to the public key with one or more digital signatures, and possibly any chained Certs and Certificate Revocation Lists (CRLs) associated with the Cert and any chained Certs, is often included with the outgoing message.

The secure e-mail message 40 sent by the e-mail sender 30 includes a component 42 including the sender's Cert, Cert chain, CRLs and digital signature and the signed message body 44. In the S/MIME secure messaging technique, Certs, CRLs and digital signatures are normally placed at the beginning of a message as shown in FIG. 2, and the message body is included in a file attachment. Messages generated by other secure messaging schemes may place message components in a different order than shown or include additional and/or different components. For example, a signed message 40 may include addressing information, such as "To:" and "From:" email addresses, and other header information not shown in FIG. 2.

When the secure e-mail message 40 is sent from the e-mail sender 30, it is routed through the WAN 32 to the wireless gateway 34, through the wireless network 36, and then to the mobile device 38. As described above, an e-mail message sender may alternatively send a message directly to a wireless gateway, to a computer system associated with a mobile device, or to a wireless VPN router or other interface for delivery to a mobile device.

The receiver of the signed message 40, the mobile device 38, typically verifies the digital signature 42 in the secure message 40 by generating a digest of the message body 44, extracting the transmitted digest from the digital signature 42, comparing the generated digest with the digest extracted from the digital signature 42, and then verifying the digital signature in the digital signature. The digest algorithm used by a secure message receiver to generate the generated digest is the same as the algorithm used by the message sender, and is normally specified in a message header, or possibly in a digital signature of the secure message. Commonly used digest algorithm include the Secure Hashing Algorithm 1 (SHA1) and Message-Digest Algorithm 5 (MD5), although other digest algorithms may be used.

In order to verify the digital signature, the receiver 38 retrieves the public key of the sender 30, generally by extracting the public key from the sender's Cert 42 attached to the message 40, and then verifies the signature on the digest in the digital signature by performing a reverse transformation on the digital signature. For example, if the message sender 30 generated the digital signature by encrypting the digest using its private key, then a receiver 38 uses the sender's public key to decrypt the digital signature to recover the original digest. The secure message 40 shown in FIG. 2 includes the sender's Cert 42, from which the sender's public key can be extracted. Where the sender's public key was extracted from an earlier message from the sender 30 and stored in a key store in the receiver's local store, the sender's public key may instead be retrieved from the local store. Alternatively, the public key may be retrieved from the sender's Cert stored in a local store, or from a Public Key Server (PKS). A PKS is a server that is normally associated with a Certificate Authority (CA) from which a Cert for an entity, including the entity's public key, is available. A PKS might reside within a corporate LAN such as 18 (FIG. 1), or anywhere on the WAN 32, Internet or other network or system through which message receivers may establish communications with the PKS.

The Cert, Cert chain and CRLs 42 are used by a receiver to ensure that the sender's Cert is valid, i.e., that the Cert has not been revoked or expired, and is trusted. A Cert is often part of a Cert chain, which includes a user's Cert as well as other Certs to verify that the user's Cert is authentic. For example, a Cert for any particular entity typically includes the entity's public key and identification information that is bound to the public key with a digital signature. Several types of Cert currently in use include, for example, X.509 Certs, which are typically used in S/MIME, and PGP Certs, which have a slightly different format. The digital signature in a Cert is generated by the issuer of the Cert, and is checked by a message receiver as described above. A Cert may include an expiry time or validity period from which a messaging client determines if the Cert has expired. When a CRL is available, the Cert is checked against the CRL to ensure that the Cert has not been revoked.

If the digital signature in a message sender's Cert is verified, the Cert has not expired or been revoked, and the issuer of the Cert is trusted by a message receiver, then the digital signature of the message is trusted by the message receiver. If the issuer of the Cert is not trusted, then the message receiver traces a certification path through the Cert chain to verify that each Cert in the chain was signed by its issuer, whose Cert is next in the Cert chain, until a Cert is found that was signed by a root Cert from a trusted source, such as a large PKS. Once a root Cert is found, then a signature can be trusted, because both the sender and receiver trust the source of the root Cert.

If a secure message was encrypted or otherwise processed by a message sender after being signed, then each receiver first decrypts or performs other inverse processing operations on the message before signature verification is performed. Where encryption or other processing was performed before signing, however, inverse processing such as decryption is performed after signature verification. Encryption and decryption involve applying a cryptographic key and cipher algorithm to information to be encrypted or decrypted. Encryption and decryption use corresponding cipher algorithms, which may or may not be the same, and either the same or different cryptographic keys. In public key systems, different keys are used for encryption and decryption, whereas in "shared secret" type operations, the same key, a secret shared between a sender and recipient, is used for both encryption and decryption.

At the e-mail sender 30, secure messaging characteristics and message signing in the message 40 are controlled by messaging settings. These settings may be either default messaging settings, or a currently selected group of messaging settings established by a user or by over-riding default or current messaging settings. In known systems, whenever a message having different message characteristics than those specified in a current group of message settings is to be sent from a messaging client, a different group of messaging settings must be selected or current setting must be over-ridden.

Frequent messaging settings changes are not only tedious and time consuming, but are also prone to error. For example, some secure messaging clients are configured to exchange either secure or insecure messages with other messaging clients. However, a messaging client that is not configured for secure messaging is unable to process received secure messages. As described above, known messaging clients allow only a single group of messaging settings to be active at any time. Therefore, when a secure messaging client exchanges messages with insecure messaging clients relatively often, a user of the secure messaging client normally selects only general messaging settings as default messaging settings to ensure that sent messages can be processed by insecure messaging clients. Then, when a secure message is to be sent to a secure messaging client, a different group of settings is selected or the current general messaging settings are over-ridden, so that a secure message is sent. When a user forgets to select secure messaging settings or over-ride general messaging settings, a message that was intended to be sent securely is sent in the clear. This situation is particularly undesirable when such a message contains confidential information, for example. Similarly, when secure messaging settings are used as default settings and not over-ridden when a message is to be sent to an insecure messaging client, the insecure messaging client is unable to process the secure message and the sender must re-transmit the message in an insecure format.

Although some known messaging clients simplify messaging settings selection by providing multiple message sending choices when an outgoing message is to be sent, messaging settings selection remains prone to user errors. In such messaging clients, an outgoing message is composed by a user and addressed to one or more recipients. When the outgoing message is to be sent from the messaging client, the user selects a group of messaging settings to control message characteristics of the outgoing message, and the message is sent to the recipients, even if the user makes an incorrect or undesired selection of messaging settings.

Figure 3:
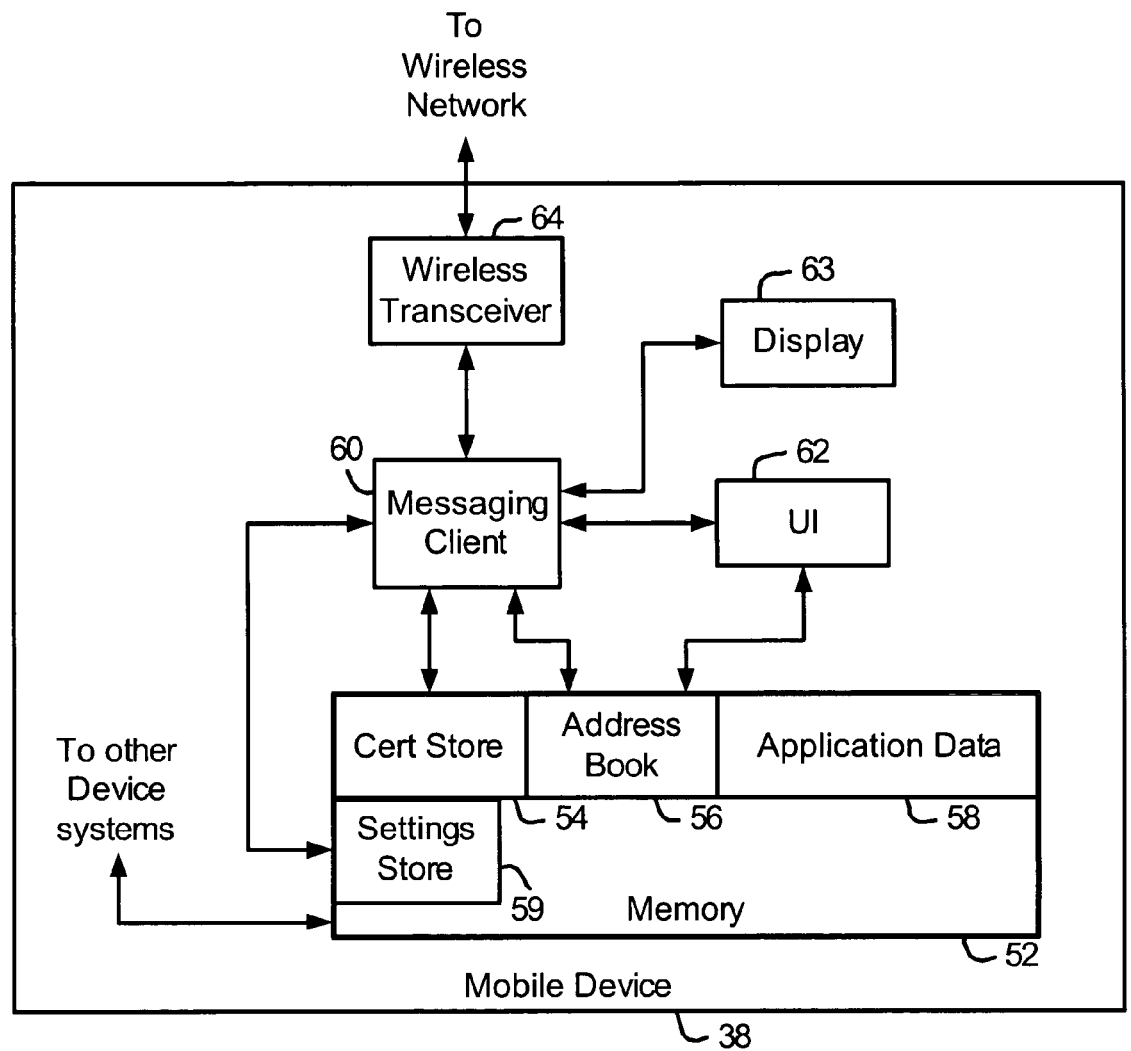
FIG. 3 is a block diagram of a wireless mobile communication device implementing a messaging settings selection system.

FIG. 3 is a block diagram of a wireless mobile communication device implementing a messaging setting selection system.

The mobile device 38 includes a memory 52, a messaging client 60, a user interface (UI) 62, a display 63, and a wireless transceiver 64.

The memory 52 is a writeable store such as a RAM into which other device components and systems write data, and includes a storage area for a Cert store 54, an address book 56 in which messaging contact information is stored, an application data storage area 58 which stores data associated with software applications on the mobile device 38, and a settings store 59 which stores messaging settings. Data stores 54, 56, 58 and 59 are illustrative examples of stores that may be implemented in a memory 52 on mobile device 38. The memory 52 is also typically used by other device systems in addition to those shown in FIG. 3 to store other types of data.

The messaging system 60 is connected to the wireless transceiver 64 and is thus enabled for communications via a wireless network.

The UI 62 may include such UI components as a keyboard or keypad, or other components which accept inputs from or provide outputs to a user of the mobile device 38. A mobile device 38 will typically include more than one UI, and the UI 62 therefore represents one or more user interfaces.

In the mobile device 38, the display 63 is typically a liquid crystal display (LCD), although other types of display may instead be used in mobile devices. The display 63 is also a user interface, but is shown separately in FIG. 3.

The messaging client 60 stores received Certs to the Cert store 54 and retrieves stored Certs from the Cert store 54. Certs are normally stored in the Cert store 54 in the format in which they are received, but may alternatively be parsed or otherwise translated into a storage format before being written to the Cert store 54. Certs may be received with secure messages, requested from a Cert source such as a PKS via the wireless transceiver 64, or loaded onto the mobile device 38 through a communications interface such as a serial port, Universal Serial Bus (USB) port, Infrared Data Association (IrDA) port, or Bluetooth™ module, from a similarly equipped external system, a PC for example. As described above, a public key in a Cert may be required for sending or receiving secure messages. Those skilled in the art will appreciate that a mobile device enabled for secure communications may include a separate key store for storing cryptographic keys, instead of or in addition to a Cert store.

The address book 56 stores contact information, at least some of which is used by the messaging client 60 in messaging operations. Entries in the address book 56 are typically used for addressing messages composed on the messaging client 60. Address book entries are also used to replace addressing information, such as an e-mail address, with a personal or familiar name when a message that is received from a sender for which an address book entry exists in the address book 56 is displayed to a user of the mobile device 38 on the display 63. An address book entry is normally created either manually, by inputting contact information or selecting an address from a received message using a UI 62, for example, or automatically, such as by configuring the messaging client 60 to store contact information when a message is received from a sender for which no entry exists in the address book 56. Contact information could also be extracted and stored in the address book 56 when a new Cert is stored to the Cert store 54, as described in co-pending U.S. Patent Application Serial No. 60/365,516, entitled "Certificate Information Storage System And Method", assigned to the assignee of the present application and incorporated herein by reference.

The settings store 59 stores messaging settings which control the characteristics of outgoing messages sent from the mobile device 38. In alternative embodiments, the settings store 59 stores indicators of message characteristics or a combination of settings and characteristics. The settings store 59 may store more than one group of messaging settings, although in known systems, only one previously selected group of settings is active at any time. Known messaging clients determine which group of messaging settings was previously selected and uses that group of settings to control the message characteristics of an outgoing message. Other known messaging clients require a user to select messaging settings when an outgoing message has been composed and is to be sent, which is prone to user error, as described above.

The messaging client 60, however, is configured to provide for selection of messaging settings for each outgoing message when the outgoing message is to be composed. In one embodiment, an additional feature of settings display is enabled using a compose screen for outgoing messages which comprises a message portion and a messaging settings portion.

Figure 4:
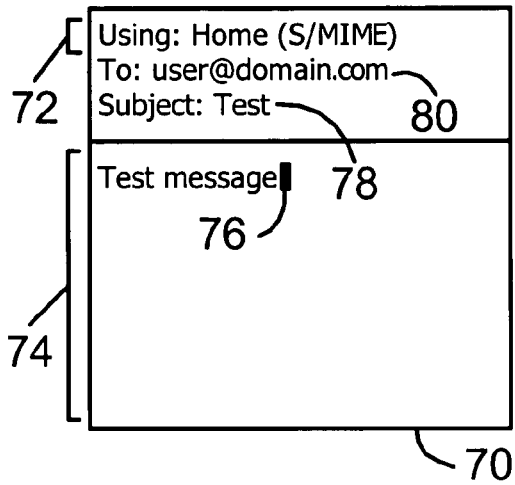
FIG. 4 is a block diagram showing a compose screen that supports one embodiment of a system and method of messaging settings selection.

FIG. 4 is a block diagram showing a compose screen that supports one embodiment of a system and method of messaging settings selection. The block diagram in FIG. 4 also supports settings display, which is an optional feature. The compose screen 70 comprises a message portion 74 and a messaging settings portion 72. The compose screen 70 also includes a "To:" line 80 and a "Subject:" line 78. The position of a cursor is indicated at 76.

The message portion 74 is used to compose message text for an outgoing message. When a user is composing message text for an outgoing message, the cursor is positioned as shown at 76, in the message area 74. Information entered by a user, such as characters typed using a keyboard or keypad, for example, is shown on the compose screen 70 at a current cursor position. Recipient addresses and a message subject are similarly entered by positioning the cursor on the "To:" line 80 and the "Subject:" line 78, respectively. As described in further detail below, recipient addresses for an outgoing message may also be retrieved from an address book. Where an outgoing message being composed is a reply or forward message related to a previous message, the "To:" line 80, the "Subject:" line 78 and the message portion 74 are typically pre-populated with corresponding information from the previous message.

The messaging settings portion 72 displays messaging settings, or a name or other identifier of a group of messaging settings, that are currently selected to control the message characteristics of the outgoing message. In the compose screen 70, a group of messaging settings called "Home (S/MIME)" is currently selected. Since current messaging settings are displayed in the compose screen 70, a user is aware of the messaging settings that have been selected for the outgoing message currently being composed, and is therefore less likely to send the outgoing message without desired message characteristics. If currently selected messaging settings do not correspond to desired message characteristics, then new messaging settings may be chosen for the outgoing message before or when the outgoing message is sent.

With reference to FIGS. 3 and 4, an outgoing message may be composed on the mobile device 38 using UIs 62 such as a keyboard and the display 63. The display 63 is configured to operate in conjunction with the messaging client 60. The messaging client 60 is configured to display the compose screen 70 on the display 63 when an outgoing message is to be composed. For example, a user may select a "compose", "forward message" or "reply to message" function from a menu or send a similar command to the messaging client 60 to invoke a compose message operation.

As described above, at least the "To:" line 80, the message portion 74, and possibly the "Subject:" line 78 of the compose screen 70 include information from a previous message when the outgoing message being composed is a forward or reply message. For an original outgoing message, the "To:" line 80, the "Subject:" line 78 and the message portion 74 are blank.

Several different schemes are possible for selecting messaging settings, depending upon the configuration and capabilities of the messaging client 60. In one embodiment, messaging settings for any message related to a previously received message are selected based on the messaging settings used for the received message, as stored in a settings store when the received message was received. Reply messages and forward messages are examples of messages that are related to received messages. For example, where a message is received in one messaging account or service supported on a mobile device, the same messaging account or service, and possibly other messaging settings used for the received message, are selected for outgoing messages related to the received message.

According to another messaging settings selection scheme, the messaging client 60 is configured to maintain a record of messaging settings used for previously sent messages. Where the messaging client 60 is also configured to receive messages, messaging settings for received messages may similarly be recorded. Such a record is indexed by message recipient or message sender, for example, and stored in the address book 56, the settings store 59, or another store on the mobile device 38. The messaging client 60 then consults the record of messaging settings before selecting a group of messaging settings for an outgoing message. As described above, although stored messaging settings are described herein, message characteristics may also or instead be recorded and used in selecting messaging settings, or alternatively characteristics, for outgoing messages.

Where the record of messaging settings is indexed by message recipient, the messaging client 60 stores an identifier of the message recipient, such as an email address, and either the messaging settings or an identifier of a group of messaging settings that were used to control the message characteristics of each sent message. Messaging settings for an outgoing message are then chosen based on an addressed recipient of the outgoing message where an entry has been stored in the record of messaging settings for the recipient. When an outgoing message is to be composed, a user inputs recipient information in the "To:" line 80 of the compose screen 70. Messaging clients typically support several mechanisms for recipient information entry, including manual address entry using a keyboard, keypad or other input device, or selection of a recipient from the address book 56. The messaging client 60 may also allow a user to enter a name or other identifier and then translate the name or identifier into an address by searching the address book 56, or possibly by querying a remote database. Outgoing message addressing operations are normally performed after a compose screen is displayed, but may instead be performed before a compose screen is displayed, such as by prompting a user for recipient information when a message compose function is invoked. When addressing operations are performed before the compose screen is displayed, or the outgoing message being composed is a reply or forward message, then at least one recipient address or name is displayed in the "To:" line 80 when the compose screen 70 is first displayed.

Once an outgoing message has been addressed to a recipient, the recipient address is shown in the "To:" line 80. In the compose screen 70, the "To:" line 80 displays the recipient address "user@domain.com". As those skilled in the art will appreciate, a "To:" line may instead display a familiar name associated with a recipient address, particularly when a recipient address is selected from the address book 56 or an entry corresponding to a recipient name or address is stored in the address book 56. The messaging client 60 then consults the messaging settings record to determine whether the record includes an entry for a message that was previously sent to the recipient. Where the record includes an entry for a message that was previously sent to the recipient, the messaging settings in the messaging settings record entry are selected for the outgoing message being composed and displayed in the messaging settings portion 72 of the compose screen 70.

When a messaging client is operating on a mobile device, as shown in FIG. 3, memory resources are typically limited. At least for such messaging clients, it is desirable to establish a maximum size or number of entries for the messaging settings record in order to ensure that memory resources are not depleted by a large messaging settings record. Although desktop and laptop computer systems running messaging clients tend to have substantially more memory resources than mobile devices, an upper limit on messaging settings record size is advantageous for such systems to conserve memory resources. Search time also increases with the size of the messaging settings record. For example, a limit of 128 entries in a messaging settings record has been found to provide efficient messaging settings selection operation, although other limits may instead be used.

For a messaging settings record having limited size, only a certain number, x, of entries is maintained. Therefore, such a messaging settings record does not include an entry for a message that was previously sent to a recipient of an outgoing message unless the previously sent message was one of the last x messages sent. Of course, a messaging settings record, regardless of whether its size is limited, contains no entry for a recipient where no messages have been previously sent to the recipient.

Default messaging settings, most recently selected messaging settings, or messaging settings that appear in the messaging settings record for other message recipients having the same domain name as the recipient of the outgoing message being composed (i.e., "domain.com" in FIG. 4), are selected and displayed in the messaging settings portion 72 where the messaging settings record does not include an entry for a message that was previously sent to the recipient. Alternatively, the messaging client 60 could be configured to prompt the user to choose messaging settings to be used for the outgoing message in this situation, and then display the chosen messaging settings or an indication thereof in the messaging settings portion 72.

As shown in FIG. 4, messaging settings called "Home (S/MIME)" have been selected for the outgoing message. In this example, "Home" indicates a messaging account or service with which the messaging client 60 and the mobile device 38 have been configured to operate, and "S/MIME" indicates a type of encoding to be applied to the outgoing message. Thus, the test message shown in FIG. 4 will be sent using a variant of S/MIME via the "Home" messaging service. This type of naming convention is particularly useful when the messaging client 60 and the mobile device 38 are enabled for operation with more than one messaging account or service, as described in further detail below although other naming conventions are possible.

Where messaging settings are displayed in the messaging settings portion 72 of the compose screen 70 when an outgoing message is being composed, the user of the messaging client 60 is aware of the messaging settings that will be used to control the message characteristics of the outgoing message when it is sent to the recipient. The messaging settings are displayed to the user while the outgoing message is being composed, which provides an opportunity for the user to determine whether the messaging settings will generate desired messaging characteristics for the outgoing message. If the messaging settings selected by the messaging client 60 will result in the outgoing message having desired message characteristics when it is sent, then the user need only invoke a send function or command without first selecting messaging settings.

Storing or caching of message settings or characteristics associated with sent and/or received messages provides a means for tracking and using information about people with whom a user communicates. For example, a user might want to be able to track the encryption algorithms that others prefer to use, whether they normally sign their messages, or other related things. A data store keeps track of the relevant settings or characteristics of the different recipients, senders, or both. A messaging client then uses the stored information to make choices on default and allowed behaviour for future communications with a that person.

The data store preferably stores encryption algorithm preferences. For example, in S/MIME, TripleDES and RC2 support is required. However, a recipient of an outgoing message might also support AES, which is a stronger algorithm. Selection of AES in this example may be enabled by determining a sender's S/MIME capabilities, from a received message. This information is then stored, and the next time the user sends to that sender (as a recipient for a sent message), the data store is queried. If that recipient supports AES, then the messaging client defaults to using that algorithm.

Another setting or characteristic that is preferably stored is whether the recipient supports compression in their secure email. This may be accomplished substantially as described above for encryption algorithms.

The data store or cache also preferably tracks the "style" of the last communication from each recipient. If the last communication received from a recipient of an outgoing message used PGP, then this will be stored. For the next outgoing message addressed to that recipient, PGP may be selected. The "action" last used by the recipient may be tracked in a similar manner. If the last email received from a recipient was signed and encrypted, then a subsequent email to that recipient is preferably also signed and encrypted.

As described above, messaging settings are preferably selected in accordance with either previously used messaging settings or default messaging settings. However, different messaging settings may be required in order for the outgoing message to have desired message characteristics when it is sent. As also described above, depending upon the configuration of the messaging client 60, different messaging settings may be selected when the outgoing message is to be sent. For other messaging clients, the user typically must either abort or suspend the compose operation or save the message being composed and end the compose operation to select different messaging settings. The new messaging settings are then displayed in the messaging settings portion 72 of the compose screen 70 and used to control message characteristics of outgoing messages.

Figure 5:
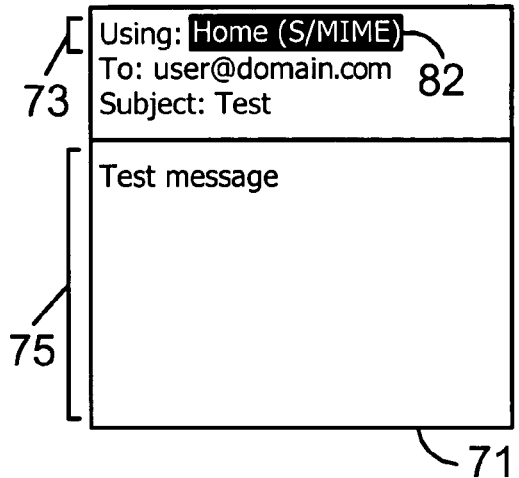
FIGS. 5-7 are block diagrams showing a compose screen that supports another embodiment of a system and method of messaging settings selection.
Figure 6:
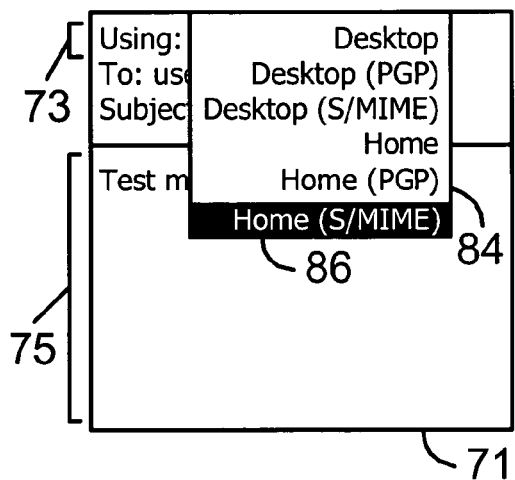
Figure 7:
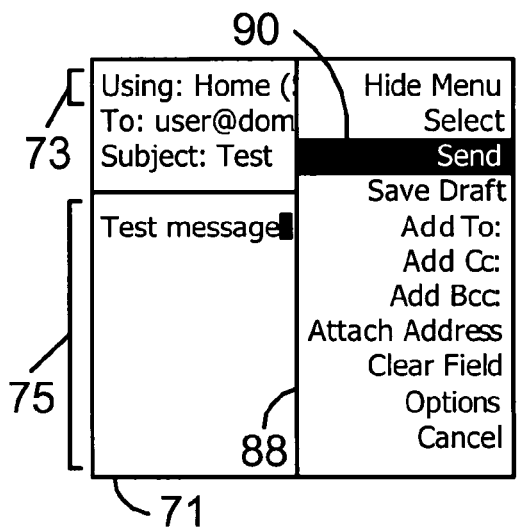

FIGS. 5-7 are block diagrams showing a compose screen that supports another embodiment of a system and method of messaging settings selection. The compose screen 71 in FIGS. 5-7 is similar to the compose screen 70 in FIG. 4, and includes a messaging settings portion 73, in which selected messaging settings are displayed, and a message portion 75, which is used to compose message text for an outgoing message. In the compose screen 71, however, the messaging settings portion 73 comprises a messaging settings selection field 82.

Compose message operations using the compose screen 71 are substantially as described above for the compose screen 70. When a user invokes a compose message feature or function using the messaging client 60 (FIG. 3), the compose screen 71 is displayed on the display 63. Information is entered or selected and displayed on the "To:" line, the "Subject:" line and in the message portion 75 by positioning the cursor in an appropriate location on the compose screen 71. Selection of initial messaging settings for display in the messaging settings portion 73 of the compose screen 71 may also be made in accordance with any of the techniques described above.

The messaging settings selection field 82 simplifies selection of different messaging settings when the selected messaging settings displayed in the messaging settings portion 73 must be changed in order to generate desired message characteristics for the outgoing message being composed. Using the messaging settings selection field 82, new messaging settings are selected, when necessary, from the compose screen 71. Whenever a user determines that different messaging settings are required, the user positions a cursor in the messaging settings selection field 82, as shown in FIG. 5.

Once the cursor has been positioned in the messaging settings selection field 82, the user inputs or selects new messaging settings. In one embodiment, operation of an input device such as a function key or thumbwheel when the cursor is positioned in the messaging settings selection field 82 displays a menu of available messaging settings, as shown at 84 in FIG. 6. Messaging settings are then selected by positioning the cursor on a menu entry and operating an input device. For example, the cursor may be positioned in the messaging settings selection field 82 by rolling a thumbwheel, the menu 84 may be displayed by depressing the thumbwheel, and messaging settings may then be selected by rolling the thumbwheel to move the cursor to a particular entry in the menu 84 and depressing the thumbwheel.

In FIG. 6, a plurality of messaging settings are listed in the menu 84. As described above, the name "Home (S/MIME)" identifies a messaging account or service with which the messaging client 60 and the mobile device 38 are configured to operate, and an S/MIME encoding scheme. Depending upon the type and capabilities of the messaging client 60, more than one type of encoding scheme may be available for a messaging account or service. For the "Home" messaging service, S/MIME, PGP, and insecure or plaintext encoding are available. The "Desktop" messaging service, which may, for example, be associated with a business or work email account, also supports insecure, PGP and S/MIME encoding. As will be apparent to those skilled in the art, the menu 84 and messaging settings selection field 82 drastically simplify the selection of new messaging settings while an outgoing message is being composed.

The menu 84 is populated by the messaging client 60 depending upon the configuration of the mobile device 38. The messaging client 60 determines the messaging services with which the mobile device 38 has been configured to operate. In FIG. 6, "Home" and "Desktop" messaging services are available, and are shown in the messaging settings menu. The messaging client 60 also determines the types of encoding supported for the messaging services, by determining which encoders are available on the mobile device 38, and with which of the messaging services each encoder is configured to operate. For example, when an encoding scheme is a public key-based secure messaging scheme, the messaging client 60 determines for which messaging services a private key has been loaded into a key store on the mobile device 38. If a different identity or messaging address is associated with each messaging service, as is often the case, then different private encryption and signature keys are normally required for secure messaging using such services. This type of encoding is preferably listed in the messaging settings menu for a messaging service only if the encoding is actually available for that service. Otherwise, a user may select a messaging service and encoding combination that cannot be used.

Where a messaging service allows or supports plaintext encoding, for insecure messaging, for example, the name of the service is displayed in the menu 84, as shown in FIG. 6. The name of each service is also displayed in the menu 84 with encoding methods identified in brackets after the service name where other types of encoding are supported for the service. In FIG. 6, both the "Desktop" and "Home" services support PGP and S/MIME. Those skilled in the art will appreciate that the particular display scheme or naming convention may be different from that shown in FIG. 6, which is presented for illustrative purposes. Other menu and display formats, controlled by a manufacturer of the mobile device 38, established by a developer of the messaging client 60, or possibly configurable by a user of the mobile device 38, for example, may also be used.

FIG. 7 shows the compose screen 71 with a message menu 88. The message menu 88 may be displayed by a user while an outgoing message is being composed or after an outgoing message has been composed and is to be sent. For example, the message menu 88 may be displayed by a user by operating a function key or input device. In the above example of a thumbwheel as an input device, the message menu 88 may be displayed by rolling the thumbwheel to position the cursor in the message portion 75, the "To:" line or the "Subject" line of the compose screen 71, and then depressing the thumbwheel. As shown, the message menu 88 includes a plurality of functions, including a "Hide Menu" function to close the message menu 88, a "Select" function to allow a user to highlight text in the message, a "Send" function to send the message, a "Save Draft" function to save the message to memory without sending the message, "Add" functions to add "To:", "Cc:", and "Bcc:" addresses to the message, an "Attach Address" function to attach an address from an address book to the message, a "Clear Field" function to clear the contents of the field in which the cursor was positioned when the message menu 88 was displayed (i.e., the message portion 75 in FIG. 7), an "Options" function 88 to display message options, and a "Cancel" function to cancel the compose operation. Those skilled in the art will appreciate that the message menu 88 is presented for illustrative purposes only, and that further, fewer, or different functions may be accessible in a message menu or a similar menu.

As described above, the messaging settings selection field 82 enables a user to select messaging settings while a message is being composed, such that only a single "Send" function need be included in the message menu 88. Where a messaging client implements a messaging selection and display system which selects messaging settings and displays the selected messaging settings in the messaging settings portion 80 of the compose screen 70 as shown in FIG. 4, more than one "Send" function, one for each available messaging service and encoding type, may be included in a message menu to allow a user to select new messaging settings before a message is sent. When a "Send" function has been invoked, the messaging client 60 processes and sends the outgoing message via the wireless transceiver 64, a wireless network, and possibly other communication links and networks, to addressed recipients of the outgoing message. The messaging client 60 performs processing operations in accordance with the selected messaging settings, such as encryption and digital signing, for example, before sending the outgoing message. The messaging client 60 may also perform such operations as data compression, or repackaging the outgoing message into an electronic envelope for transfer to message recipients through a host computer system associated with the mobile device 38 on which the messaging client 60 is operating.

Figure 8:
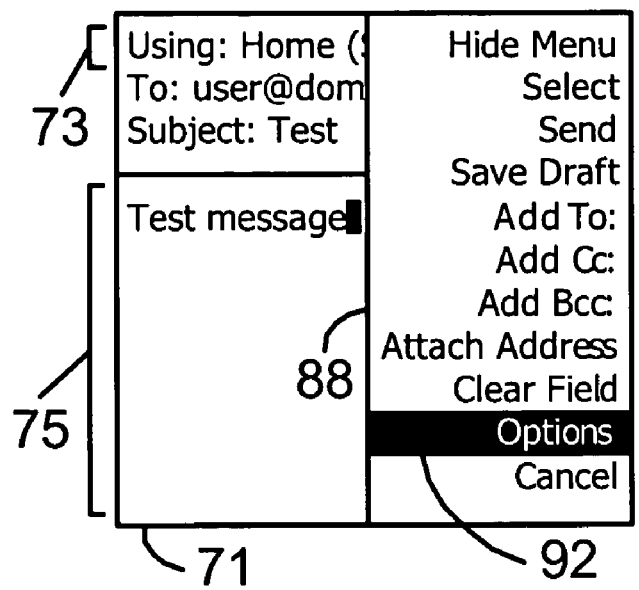
FIG. 8 is a block diagram showing a compose screen and a message menu.

Some message characteristics for an outgoing message may also be selected or controlled by selecting message options using the "Options" function on the message menu 88. FIG. 8 is a block diagram showing a compose screen and a message menu. In FIG. 8, as in FIG. 7, the message menu 88 includes a plurality of functions. Each function is invoked by positioning a cursor on a particular entry in the menu and then selecting the entry, for example by rolling and then depressing a thumbwheel. The "Options" function is selected in FIG. 8, as shown at 92.

Figure 9:
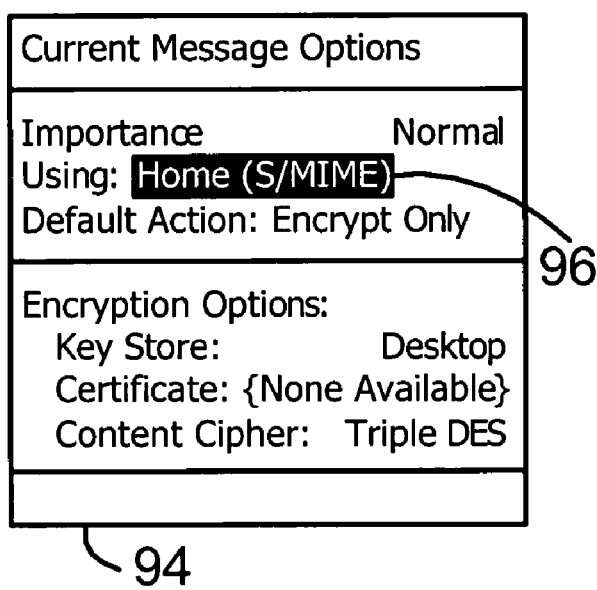
FIG. 9 is a block diagram showing a message options screen.

FIG. 9 is a block diagram showing a message options screen. The message options screen 94 is displayed when the "Options" function is selected on the message menu 88. As shown, the outgoing message currently being composed has a "Normal" importance level, will be sent using the "Home" messaging service with "S/MIME" encoding, and will be encrypted only before it is sent. The message options screen 94 also shows encryption options, since the current "Home (S/MIME)" messaging settings specify that the message will be encrypted. Such options may or may not be displayed when an outgoing message being composed will not be encrypted. Where an outgoing message will also or instead be digitally signed, signature options may similarly be displayed in a message options screen.

In the message options screen 94, at least an importance level may be selected. The portion of the message options screen 94 which displays the importance level therefore preferably includes a message importance level selection field to provide for selection of an importance level. For example, an importance level may be selected from a menu of importance levels. The importance level menu may be displayed substantially as described above, by operating a function key or another input device when the cursor is positioned in the importance level selection field. Actions other than the default action for a particular messaging service or encoding type could also be selected in a similar manner where more than one such action is available. In the example of S/MIME encoding, encrypt only, sign only, encrypt and then sign, and sign and then encrypt are all variants of S/MIME that may be available for an outgoing message. An encoding action display portion of the message options screen 94 may comprise a selection field through which encoding actions may be specified or selected.

In addition, or instead, messaging settings are selectable from the message options screen 84. To this end, a messaging settings portion of the message options screen 94, in the "Using" line in FIG. 9, preferably comprises a messaging settings selection field 96. Messaging settings are thereby not only displayed, but are also selectable, through the messaging settings selection field 96. Selection of messaging settings from the messaging settings selection field 96 is preferably substantially as described above for the messaging settings selection field 82. The messaging settings menu 84 may be invoked from either the messaging settings field 82 in the messaging settings portion of the compose screen 71 (FIG. 5) or the messaging settings field 96 in the message options screen 94. Messaging settings selected in this manner are used, for example, when no record for a message recipient exists in a settings or analogous data store.

Figure 10:
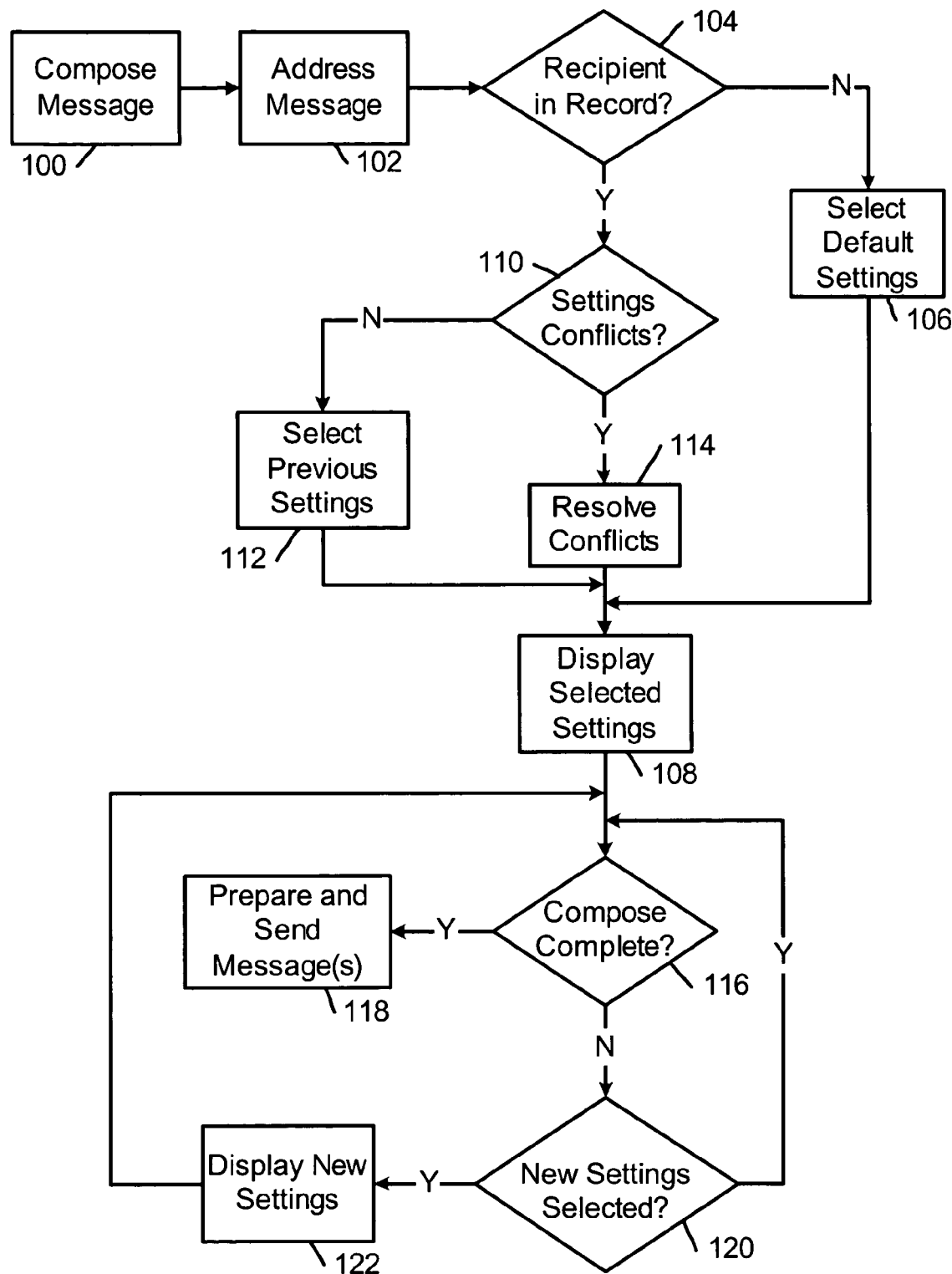
FIG. 10 is a flow chart illustrating a method of selecting messaging settings on a messaging client.

FIG. 10 is a flow chart illustrating a method of selecting and displaying messaging settings on a messaging client. Operations associated with displaying selected messaging settings are optional.

At steps 100 and 102, a user starts a compose message operation and addresses the outgoing message being composed. As described above, an outgoing message may be addressed to message recipients before a compose message operation is started, or while the message is being composed. Message recipients are typically manually entered by a user, selected from an address book, or automatically selected where the message is a reply message. A compose screen comprising a messaging settings portion and a message portion is displayed when a message is to be composed.

In order to select initial messaging settings for the outgoing message, a messaging client then preferably determines, at step 104, whether a record of previous messages, including at least received messages and possibly sent messages, includes an entry associated with the message recipient or recipients. Where the record does not include an entry associated with any message recipient, default messaging settings are selected at step 106 and displayed in the messaging settings portion of the compose screen at step 108.

Where the record includes an entry associated with a message recipient, then initial messaging settings selection is preferably based on the entry, or, if more than one entry is found, then on one of the entries. At step 110, the messaging client determines whether a settings conflict exists. If only a single entry is found in the message record at step 104, then there is no conflict, the previous messaging settings from the record are selected at step 112 and displayed in the messaging settings portion of the compose screen at step 108.

A settings conflict exists, for example, where more than one entry, with different associated messaging settings, is found in the messaging settings record. The different messaging settings may correspond to different addressed message recipients, or possibly different messages sent to or received from the same addressed recipient. Instead, or in addition, conflict resolution at step 114 includes selecting a most secure set of messaging settings from the entries found in the messaging settings record for addressed recipients, selecting a most recently used set of messaging settings from the found entries, selecting a most often used set of messaging settings from the found entries, prompting the user to select messaging settings from the found entries, or selecting the messaging settings associated with a first addressed message recipient, for example. Other conflict resolution schemes are also possible.

Selected messaging settings are displayed in the messaging settings portion of the compose screen at step 108. The user then proceeds to compose the outgoing message, and may select new messaging settings while the message is being composed. As described above, this may involve exiting the compose screen to reset message options or select new messaging settings. However, the messaging client preferably supports at least one messaging settings selection field, in the compose screen, the message options screen, or both. If new messaging settings are selected before the compose operation is completed, as determined at step 120, then the new messaging settings are displayed in the message settings portion of the compose screen, and the message options screen if the messaging client is so enabled, at step 122. When the compose operation is complete (step 116), the outgoing message is prepared and sent at step 118 in accordance with the selected messaging settings.

Although shown as sequential steps 116 and 120, it should be appreciated that detection of the completion of a compose operation and selection of new settings are preferably invoked by the user when the outgoing message is complete or new messaging settings are to be selected. A messaging client typically detects predetermined inputs or menu selections, as described above, to determine that a message should be sent or that new messaging settings have been selected.

It should also be appreciated that a compose operation may include further or fewer method steps than those shown in FIG. 10. For example, messaging clients typically support cancellation of operations such as a compose operation, such as by selecting a "Cancel" function from a message menu as described above.

In addition, FIG. 10 shows one embodiment of initial messaging settings selection, based on either a messaging settings record or default messaging settings. Any combination of the messaging settings selection schemes described above may be used to select messaging settings for an outgoing message.

Figure 11:
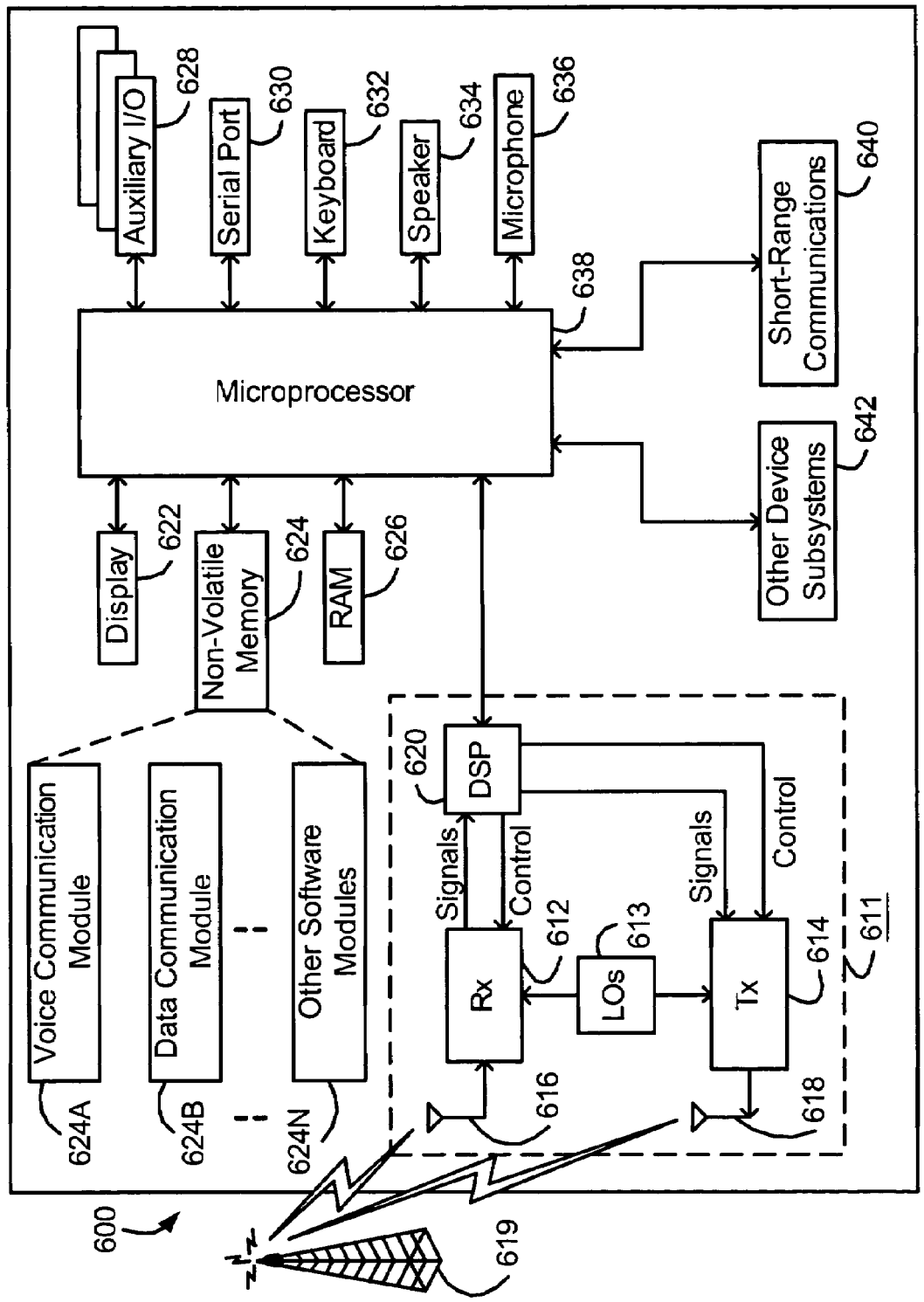
FIG. 11 is a block diagram of a wireless mobile communication device.

FIG. 11 is a block diagram of a wireless mobile communication device. The mobile device 600 is preferably a two-way communication device having at least voice and data communication capabilities. The mobile device 600 preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

The mobile device 600 includes a transceiver 611, a microprocessor 638, a display 622, non-volatile memory 624, RAM 626, auxiliary input/output (I/O) devices 628, a serial port 630, a keyboard 632, a speaker 634, a microphone 636, a short-range wireless communications sub-system 640, and other device sub-systems 642. The transceiver 611 includes transmit and receive antennas 616, 618, a receiver (Rx) 612, a transmitter (Tx) 614, one or more local oscillators (LOs) 613, and a digital signal processor (DSP) 620. Within the non-volatile memory 624, the mobile device 600 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions.

As described above, the mobile device 600 is preferably a two-way communication device having voice and data communication capabilities. Thus, for example, the mobile device 600 may communicate over a voice network, such as any of the analog or digital cellular networks, and may also communicate over a data network. The voice and data networks are depicted in FIG. 11 by the communication tower 619. These voice and data networks may be separate communication networks using separate infrastructure, such as base stations, network controllers, etc., or they may be integrated into a single wireless network.

The communication subsystem 611 is used to communicate with the network 619. The DSP 620 is used to send and receive communication signals to and from the transmitter 614 and receiver 612, and may also exchange control information with the transmitter 614 and receiver 612. If the voice and data communications occur at a single frequency, or closely-spaced set of frequencies, then a single LO 613 may be used in conjunction with the transmitter 614 and receiver 612. Alternatively, if different frequencies are utilized for voice communications versus data communications, then a plurality of LOs 613 can be used to generate a plurality of frequencies corresponding to the network 619. Although two antennas 616, 618 are depicted in FIG. 11, the mobile device 600 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., will be dependent upon the communication network 619 in which the mobile device 600 is intended to operate. For example, a mobile device 600 intended to operate in a North American market may include a communication subsystem 611 designed to operate with the Mobitex or DataTAC mobile data communication networks and also designed to operated with any of a variety of voice communication networks, such as AMPS, TDMA, CDMA, PCS, etc., whereas a mobile device 600 intended for use in Europe may be configured to operate with the GPRS data communication network and the GSM voice communication network. Other types of data and voice networks, both separate and integrated, may also be utilized with the mobile device 600.

Depending upon the type of network 619, the access requirements for the dual-mode mobile device 600 may also vary. For example, in the Mobitex and DataTAC data networks, mobile devices are registered on the network using a unique identification number associated with each device. In GPRS data networks, however, network access is associated with a subscriber or user of a mobile device 600. A GPRS device typically requires a subscriber identity module ("SIM"), which is required in order to operate the mobile device 600 on a GPRS network. Local or non-network communication functions (if any) may be operable, without the SIM, but the mobile device 600 will be unable to carry out any functions involving communications over the network 619, other than any legally required operations, such as '911' emergency calling.

After any required network registration or activation procedures have been completed, the mobile device 600 may send and receive communication signals, preferably including both voice and data signals, over the network 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618. Although a single transceiver 611 is shown in FIG. 11 for both voice and data communications, the mobile device 600 may include two distinct transceivers, a first transceiver for transmitting and receiving voice signals, and a second transceiver for transmitting and receiving data signals.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 600. Many types of microprocessors or microcontrollers could be used for this part, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the non-volatile memory 624 for execution by the microprocessor 638. For example, the voice communication module 624A may provide a high-level user interface operable to transmit and receive voice calls between the mobile device 600 and a plurality of other voice devices via the network 619. Similarly, the data communication module 624B may provide a high-level user interface operable for sending and receiving data, such as e-mail messages, files, organizer information, short text messages, etc., between the mobile device 600 and a plurality of other data devices via the network 619.

The microprocessor 638 also interacts with other device subsystems, such as the display 622, non-volatile memory 624, random access memory (RAM) 626, auxiliary input/output (I/O) subsystems 628, serial port 630, keyboard 632, speaker 634, microphone 636, a short-range communications subsystem 640 and any other device subsystems generally designated as 642. The components 628, 632, 634 and 636 are examples of the types of subsystems that could be provided as UIs 62 (FIG. 3). The modules 624A-N are executed by the microprocessor 638 and may provide a high-level interface between a user of the mobile device and the mobile device. This interface typically includes a graphical component provided through the display 622, and an input/output component provided through the auxiliary I/O 628, keyboard 632, speaker 634, or microphone 636.

Some of the subsystems shown in FIG. 11 perform communication-related functions, whereas other subsystems may provide "resident" or on-device functions. Notably, some subsystems, such as keyboard 632 and display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as non-volatile memory 624. In addition to the operating system and communication modules 624A-N, the non-volatile memory 624 may also include a file system for storing data. A storage area is also preferably provided in the non-volatile memory 624 to store public keys, a private key, and other information required for secure messaging. The operating system, specific device applications or modules, or parts thereof, may be temporarily loaded into a volatile store, such as RAM 626 for faster operation. Moreover, received communication signals may also be temporarily stored to RAM 626 before permanently writing them to a file system located in the non-volatile store 624. As those skilled in the art will appreciate, the non-volatile store 624 may be implemented as a Flash memory component or a battery backed-up RAM, for example.

An exemplary application module 624N that may be loaded onto the mobile device 600 is a personal information manager (PIM) application providing PDA functionality, such as calendar events, appointments, and task items. This module 624N may also interact with the voice communication module 624A for managing phone calls, voice mails, etc., and may also interact with the data communication module 624B for managing e-mail communications and other data transmissions. Alternatively, all of the functionality of the voice communication module 624A and the data communication module 624B may be integrated into the PIM module.

The non-volatile memory 624 preferably provides a file system to facilitate storage of PIM data items on the device. The PIM application preferably includes the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

The mobile device 600 may also be manually synchronized with a host system by placing the mobile device 600 in an interface cradle, which couples the serial port 630 of the mobile device 600 to the serial port of the host system. The serial port 630 may also be used to enable a user to establish messaging settings through an external device or software application, to download other application modules 624N for installation, and to load Certs, keys and other information onto a device. This wired download path may be used to load an encryption key onto the mobile device 600, which is a more secure method than exchanging encryption information via the wireless network 619.

Additional application modules 624N may be loaded onto the mobile device 600 through the network 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 600 and may provide enhanced on-device functions, communication-related functions, or both. For example, secure communication applications may enable electronic commerce functions and other such financial transactions to be performed using the mobile device 600.

When the mobile device 600 is operating in a data communication mode, a received signal, such as a text message or a web page download, is processed by the transceiver 611 and provided to the microprocessor 638, which preferably further processes the received signal for output to the display 622, or, alternatively, to an auxiliary I/O device 628. A user of mobile device 600 may also compose data items, such as email messages, using the keyboard 632, which is preferably a complete alphanumeric keyboard laid out in the QWERTY style, although other styles of complete alphanumeric keyboards such as the known DVORAK style may also be used. User input to the mobile device 600 is further enhanced with a plurality of auxiliary I/O devices 628, which may include a thumbwheel input device, a touchpad, a variety of switches, a rocker input switch, etc. The composed data items input by the user may then be prepared as specified in selected messaging settings and transmitted over the communication network 619 via the transceiver 611.

When the mobile device 600 is operating in a voice communication mode, the overall operation of the mobile device 600 is substantially similar to the data mode, except that received signals are preferably output to the speaker 634 and voice signals for transmission are generated by a microphone 636. Alternative voice or audio I/O subsystems, such as a voice message recording subsystem, may also be implemented on the mobile device 600. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, may detect the caller identification information of an incoming voice call and display it on the display 622.

A short-range communications subsystem 640 is also included in the mobile device 600. For example, the subsystem 640 may include an infrared device and associated circuits and components, or a short-range wireless communication module such as a Bluetooth™ communication module or an 802.11 module to provide for communication with similarly-enabled systems and devices. Those skilled in the art will appreciate that "Bluetooth" and "802.11" refer to sets of specifications, available from the Institute of Electrical and Electronics Engineers (IEEE), relating to wireless personal area networks and wireless LANs, respectively.

The above description relates to one or more examples. Many variations will be apparent to those knowledgeable in the field, and such variations are within the scope of the application.

For example, although a wireless mobile communication device is shown in FIG. 11 and described as one possible system on which a messaging client may operate, messaging settings selection systems and methods may also be implemented in other messaging clients, including those configured for operation on desktop, laptop, or networked computer systems.

The use of numeric or alphabetic labelling in the claims that follow is purely for convenience and reference. The labelling is not intended to limit the scope of the claims or mandate particular order of particular limitations. Further, in practice limitations as set forth in the claims can occur in any suitable order, can be rearranged or combined or otherwise integrated without departing from the claim scope.

What is claimed is:

1. A method of selecting messaging settings on a messaging client, the method comprising the steps of:
    (a) providing a message composition interface for composing an outgoing message, wherein the interface comprises a message portion and a messaging settings portion; and
    (b) receiving from the messaging settings portions a messaging setting associated with the outgoing message being composed in the provided message composition interface;
    wherein more than one type of encryption scheme is available and displayed within the messaging settings portion;
    wherein the received messaging setting comprises a message security characteristic;
    wherein the received messaging setting comprises an indication for encryption;
    wherein the indication for encryption includes an indication of which of the more than one type of encryption scheme has been selected:
    wherein the indication for encryption also includes an identification of a messaging account or service with which the messaging client is configured to operate.

2. The method of claim 1, and further comprising the step of (c) transmitting the outgoing message based at least in part upon the received messaging setting.

3. The method of claim 1, and further comprising the step of (c) displaying the received messaging setting in the messaging settings portion of the provided interface.

4. The method of claim 3, and further comprising the step of (d) transmitting the outgoing message based at least in part upon the received messaging setting.

5. The method of claim 1, wherein the messaging account or service identifies a home messaging service or a desktop messaging service; said method further comprising the step of (c) repeating step (b) for a plurality of messaging settings.

6. The method of claim 5, wherein each of the plurality of messaging settings is a message format characteristic or a message security characteristic.

7. The method of claim 1, wherein the messaging settings portion for the outgoing message includes a field that is modified by a user to indicate a change in message setting for a first message, wherein the modified field for the outgoing message does not modify message settings of a subsequently composed outgoing message.

8. The method of claim 1, wherein the message composition interface includes a message header portion, wherein the message header portion includes a TO field and a SUBJECT field, wherein the message header portion includes the messaging settings portion.

9. The method of claim 8, and further comprising the step of (c) displaying the received messaging setting in the messaging settings portion of the provided interface.

10. The method of claim 1, wherein the message portion includes a text field for allowing a user to enter a message.

11. The method of claim 1, wherein the messaging client executes on a desktop computer, a notebook computer, or a mobile computing device.

12. One or more computer readable media storing instructions that upon execution by a computer cause the computer to allow selection of messaging settings within a messaging client by performing the steps of claim 1.

13. A system for selecting messaging settings on a messaging client, the system comprising:
    (a) a user output device adapted to display data communicated by a system processor in a manner perceivable by an end user;
    (b) a user input device adapted to receive data from an end user and communicate the entered data to the system processor;
    (c) the system processor, wherein the system processor comprises one or more processing elements, wherein the system processor is in communication with the user input and output devices and wherein the one or more processing elements are programmed or adapted at least to:
        (i) cause the user output device to display a message composition interface, wherein the interface comprises a message portion and a messaging settings portion;
        wherein more than one type of encryption scheme is available and displayed within the messaging settings portion;
        (ii) receive a messaging setting via the user input device; and
        (iii) cause the user output device to display the received messaging setting in the messaging settings portion of the message composition interface;
    wherein the received messaging setting comprises a message security characteristic;
    wherein the received messaging setting comprises an indication for encryption;
    wherein the indication for encryption includes an indication of which of the more than one type of encryption scheme has been selected;
    wherein the indication for encryption also includes an identification of a messaging account or service with which the messaging client is configured to operate.

14. The system of claim 13, wherein the user output device and the user input device are an integrated unit.

15. The system of claim 14, wherein the integrated unit is a touch sensitive screen.

16. The system of claim 13, wherein the user output device is a visual display, a speaker, a tactile display or combinations thereof.

17. The system of claim 16, wherein the user output device comprises a liquid crystal display.

18. The system of claim 13, wherein the user input device is a tactile entry device, an auditory entry device, or combinations thereof.

19. The system of claim 18, wherein the user input device is a touch sensitive pad, a touch sensitive screen, a keyboard, a mouse or combinations thereof.

20. The system of claim 13, and further comprising (d) a wireless transceiver in communication with the system processor and wherein the one or more processing elements of the system processor are further programmed or adapted at least to transmit an outgoing massaged via the wireless transceiver based at least in part upon the received messaging setting.

21. The system of claim 13, and further comprising (d) a data store in communication with the system processor and wherein the one or more processing of the system processor are further programmed or adapted at least to store the received message setting in the data store.

22. A system for selecting messaging settings on a messaging client, the system comprising:
- (a) storing means for storing one or more messaging settings;
- (b) input means for receive data from an end user;
- (c) output means for rendering data in a manner perceivable by an end user;
- (d) processing means for:
    - (i) displaying a message composition interface via the output means, wherein the interface comprises a message portion and a messaging settings portion;

wherein more than one type of encryption scheme is available and displayed within the messaging settings portion;
    - (ii) receiving a messaging setting via the user input device; and
    - (iii) displaying the received messaging setting via the output means in the messaging settings portion of the displayed interface;

wherein the received messaging setting comprises a message security characteristic;

wherein the received messaging setting comprises an indication for encryption;

wherein the indication for encryption includes an indication of which of the more than one type of encryption scheme has been selected;

wherein the indication for encryption also includes an identification of a messaging account or service with which the messaging client is configured to operate.

\* \* \* \* \*

UNITED STATES PATENT AND TRADEMARK OFFICE
CERTIFICATE OF CORRECTION

PATENT NO.         : 7,539,730 B2                                         Page 1 of 1
APPLICATION NO. : 10/688543
DATED              : May 26, 2009
INVENTOR(S)        : Adams et al.

It is certified that error appears in the above-identified patent and that said Letters Patent is hereby corrected as shown below:

Column 22, Line 63, delete "massaged" and substitute therefore -- message --.

Signed and Sealed this

Twenty-first Day of July, 2009

JOHN DOLL
*Acting Director of the United States Patent and Trademark Office*